(12) United States Patent
Schoeny et al.

(10) Patent No.: US 10,750,658 B2
(45) Date of Patent: Aug. 25, 2020

(54) MULTI-VARIETY SEED METER WITH PRIORITY DELIVERY OF EARLIER SUPPLIED SEED

(71) Applicant: CNH Industrial America LLC, New Holland, PA (US)

(72) Inventors: Christopher Schoeny, Joliet, IL (US); Chad M. Johnson, Arlington Heights, IL (US)

(73) Assignee: CNH Industrial America LLC, New Holland, PA (US)

( * ) Notice: Subject to any disclaimer, the term of this patent is extended or adjusted under 35 U.S.C. 154(b) by 210 days.

(21) Appl. No.: 15/915,579

(22) Filed: Mar. 8, 2018

(65) Prior Publication Data

US 2019/0274243 A1    Sep. 12, 2019

(51) Int. Cl.
*A01C 7/04*    (2006.01)
*A01C 21/00*    (2006.01)

(52) U.S. Cl.
CPC ............ *A01C 7/046* (2013.01); *A01C 21/005* (2013.01)

(58) Field of Classification Search
CPC ......... A01C 7/046; A01C 7/044; A01C 7/042; A01C 7/04; A01C 7/00; A01C 21/005; A01C 21/00
See application file for complete search history.

(56) References Cited

U.S. PATENT DOCUMENTS

| | | |
|---|---|---|
| 4,928,858 A | 5/1990 | Tite |
| 6,581,533 B1 | 6/2003 | Hagen et al. |
| 6,581,535 B2 | 6/2003 | Barry et al. |
| 8,448,585 B2 | 5/2013 | Wilhelmi et al. |
| 8,543,238 B2 | 9/2013 | Straeter |
| 8,752,490 B2 | 6/2014 | Beaujot |
| 8,863,676 B2 | 10/2014 | Brockmann et al. |
| 9,730,379 B2 | 8/2017 | Wendte et al. |

FOREIGN PATENT DOCUMENTS

| | | |
|---|---|---|
| DE | 19841091 A1 | 3/2000 |
| JP | 2010172320 A | 8/2010 |
| WO | 03/079760 A1 | 10/2003 |

*Primary Examiner* — Christopher J. Novosad
(74) *Attorney, Agent, or Firm* — Rebecca L. Henkel; Rickard K. DeMille

(57) ABSTRACT

A multi-variety seed meter can include a set of divider walls in a seed chamber to promote seed delivery on a first-in-first-out (FIFO) basis. This can be helpful to reduce the amount of seed variety mixing which may occur at transition points while planting in an agricultural field, since the first variety can be substantially exhausted from the seed meter before the second variety begins to get picked up by a seed transport member.

16 Claims, 12 Drawing Sheets

MULTI-VARIETY SEED METER WITH PRIORITY DELIVERY OF EARLIER SUPPLIED SEED

FIELD OF THE INVENTION

The invention relates generally to seed meters for planters and, in particular, to seed meters for planters having supply and return sumps for prioritizing delivery of earlier supplied seed over later supplied seed by collecting earlier supplied seed from the return sump before collecting any seed from the supply sump.

BACKGROUND OF THE INVENTION

Modern farming practices strive to increase yields of agricultural fields. Technological advances of planters allow for better agronomic characteristics at the time of planting, such as providing more accurate seed depth, improved uniformity of seed depth across the planter, and improved accuracy of in-row seed spacing. To reduce operating expenses, farm equipment is operated at relatively faster travel speeds, which reduces the amount of operating time to complete certain tasks. When operating equipment at faster travel speeds, it can be important to maintain the quality of operation and good agronomic characteristics that can be achieved while operating at relatively slower operating speeds. This can be especially difficult to accomplish during planting, which requires precise seed depth placement and spacing accuracy in order to maintain a good seed environment. Furthermore, a single field can have yield performance inconsistencies between different areas of the field. That is because a field can have a wide variety of soil types and management types or zones, such as irrigated and non-irrigated zones in different areas. Seed companies are developing multiple varieties of each of their seed product types to optimize yield in these different areas. The different seed varieties offer improved performance characteristics for different types of soil and management practices. Efforts have been made to plant multiple varieties of a particular seed product type in different areas of fields with different soil types or management zones. These efforts include planters that have different bulk till hoppers and require the reservoir for each seed meter to be completely cleaned out or planted out before a different seed variety can be delivered to the seed meters. Some planters allow for planting two varieties and include ancillary row units or two separate and distinct seed meters at every row unit. Other planters allow for planting multiple varieties by feeding seeds of different varieties to seed meters at different times.

SUMMARY OF THE INVENTION

A multi-variety seed meter can include a set of divider walls in a seed chamber to promote seed delivery on a first-in-first-out (FIFO) basis. This can be helpful to reduce the amount of seed variety mixing which may occur at transition points while planting in an agricultural field, since the first variety can be substantially exhausted from the seed meter before the second variety begins to get picked up by a seed transport member.

In one aspect, divider walls can be placed within a seed chamber of a seed meter to separate an incoming supply of seed from seed that may already be in the seed chamber. A relatively narrow path can be created for seeds to flow through in the pick-up area. A ramp can return seed to the front of the seed meter where open cells of a seed transport member return to the seed chamber.

The dividers can create a continuously moving circuitous flow of seed. As seeds get pulled to the seed transport member in a pick-up area, any extra seeds that are not picked up by cells can run down a ramp to be placed at a far front end of the seed meter where empty cells of the seed transport member can return to the seed chamber. In doing so, these seeds get priority pick-up to the seed transport member, while seeds that have been more recently introduced to the seed supply sump are less likely to be picked up by the seed transport member, since the cells are already occupied by seeds as they pass the seed supply sump.

Accordingly, the system can be added to existing seed meters as an insert. This system can be used with either a variety switching system with gravity flow of seeds, or with a seed variety dosing system such as with a motor driven fluted roll or a solenoid driven gate which can drop seed in discrete quantities.

Aspects of the invention can include: a curved wall placed in a seed pickup area which can sit above and in close proximity to seed picked up by seed cells; a ramp portion which returns seeds from a back of the seed meter (above the seed pickup area) to a front of the seed meter (where empty disk cells return to the seed chamber); and/or a seed supply port and corresponding seed supply sump located under a seed return ramp and between two ends of the ramp.

Specifically then, one aspect of the present invention provides a seed meter for planting seeds on an agricultural field, including: a housing defining an enclosure that surrounds a housing cavity; a seed transport member arranged at least partially within the housing cavity, the seed transport member being configured to rotate within the housing cavity, the seed transport member including multiple cells configured to individually capture seeds to provide singulation of seeds for individual delivery onto an agricultural field; a seed supply sump within the housing cavity, the seed supply sump being configured to collect seeds received from outside of the housing cavity through a seed supply port, in which travel of the seed transport member through the seed supply sump captures seeds in cells when the cells are empty and moves captured seeds and at least some uncaptured seeds through a seed supply path in the housing cavity; and a seed return sump within the housing cavity, the seed return sump being configured to collect seeds received from within the housing cavity through a seed return path, in which travel of the seed transport member past the seed supply path causes the at least some uncaptured seeds to fall to the seed return path while the captured seeds continue to rotate in the cells for individual delivery onto the agricultural field, in which the seed return sump is arranged before the seed supply sump in a direction of travel of the seed transport member so that empty cells of the seed transport member travel through the seed return sump to pick up available seeds in the seed return sump before traveling through the seed supply sump to pick up available seeds in the seed supply sump.

Another aspect can provide a method for planting seeds on an agricultural field, including: rotating a seed transport member arranged at least partially within a housing cavity, the seed transport member including multiple cells configured to individually capture seeds to provide singulation of seeds for individual delivery onto an agricultural field; receiving seeds from outside of the housing cavity through a seed supply port and collecting the seeds in a seed supply sump within the housing cavity, in which rotating the seed transport member through the seed supply sump captures seeds in cells when the cells are empty and moves captured seeds and at least some uncaptured seeds through a seed supply path in the housing cavity; receiving seeds from within the housing cavity through a seed return path and collecting the seeds in a seed return sump within the housing cavity, wherein rotating the seed transport member past the seed supply path causes the at least some uncaptured seeds to fall to the seed return path while the captured seeds continue to rotate with the seed transport member for individual delivery onto the agricultural field; and arranging the seed return sump before the seed supply sump in a direction of travel of the seed transport member so that empty cells of the seed transport member travel through the seed return sump to pick up available seeds in the seed return sump before traveling through the seed supply sump to pick up available seeds in the seed supply sump.

Other aspects, objects, features, and advantages of the invention will become apparent to those skilled in the art from the following detailed description and accompanying drawings. It should be understood, however, that the detailed description and specific examples, while indicating preferred embodiments of the present invention, are given by way of illustration and not of limitation. Many changes and modifications may be made within the scope of the present invention without departing from the spirit thereof, and the invention includes all such modifications.

BRIEF DESCRIPTION OF THE DRAWINGS

Preferred exemplary embodiments of the invention are illustrated in the accompanying drawings in which like reference numerals represent like parts throughout.

DETAILED DESCRIPTION OF THE PREFERRED EMBODIMENTS

Figure 1:
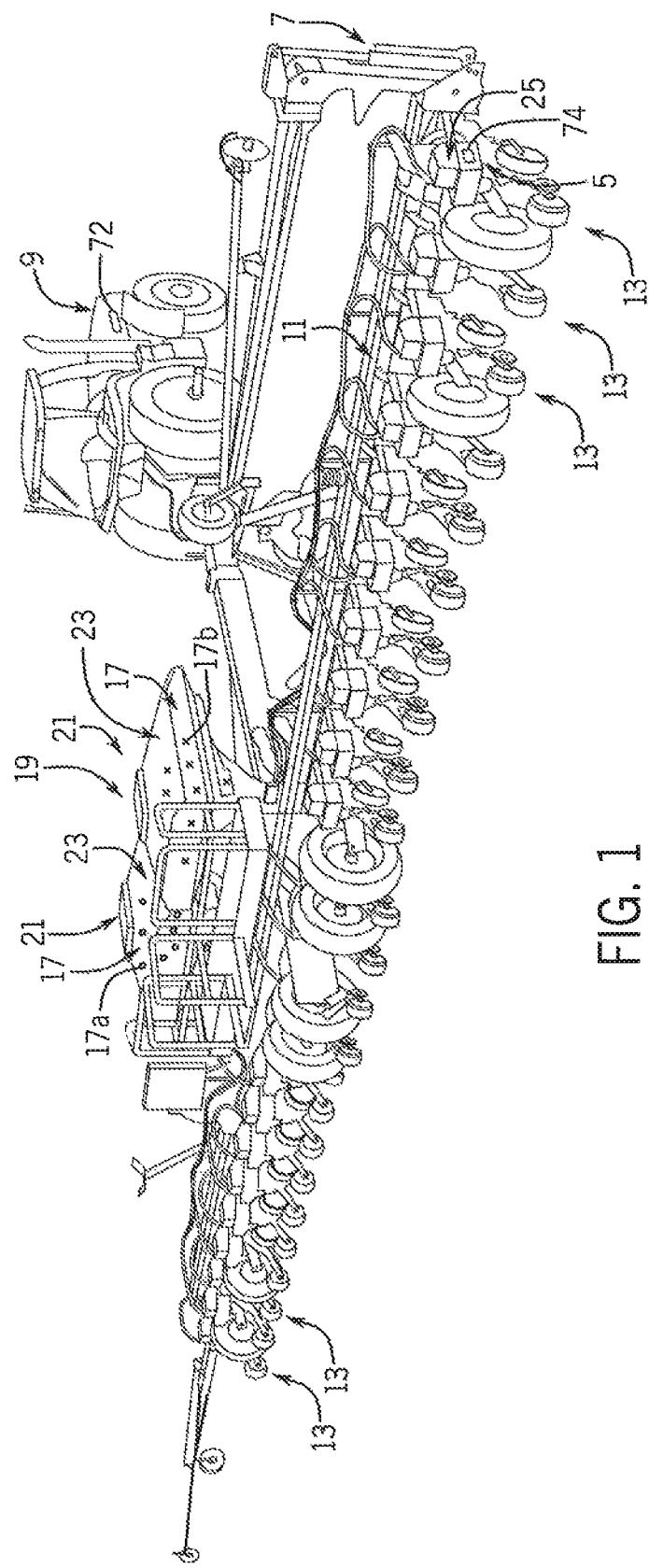
FIG. 1 is an isometric view of a planter with multiple variety seed meters in accordance with the present invention.

Referring now to the drawings and specifically to FIG. 1, a multiple variety seed meter is shown as seed meter 5, incorporated in planter 7. Seed meter 5 is configured to automatically and rapidly switch between the types or varieties of seed being delivered during planting in a single planting pass. Seed meter 5 can include a seed supply sump and a seed return sump to promote seed delivery out of the seed meter 5 on a first-in-first-out (FIFO) basis, as explained in greater detail elsewhere herein.

Planter 7 may be one of the EARLY RISER® series planters available from Case IH and is typically pulled by a traction device such as a tractor 9. A frame 11 of the planter 7 supports multiple row units 13 that are substantially identical. Each row unit 13 includes various support, metering, and ground-engaging components. These may include a sub-frame that is connected to the frame 11 of the planter 7 by way of a parallel linkage system and furrow opening and closing mechanisms toward front and back ends of the row unit 13. The opening and closing mechanisms may include opener disks and closing disks, respectively, or other ground-engaging tools for opening and closing a furrow. Each row unit 13 may include a gauge wheel configured for adjusting furrow depth by limiting soil penetration of the furrow-opening mechanism while creating the furrow, and a press wheel may be arranged to roll over the closed furrow and to further firm the soil over the seed to promote favorable seed-to-soil contact.

Still referring to FIG. 1, seed 17 is held in a seed storage system shown here as bulk storage in a bulk storage system 19. Bulk storage system 19 has at least one bulk fill hopper 21, shown here as having two central bulk fill hoppers 21 supported by the frame 11 of the planter 7, remote from the row units 13. The bulk storage system 19 has two compartments 23, with one shown in each of the bulk fill hoppers 21. It is understood that the bulk or other storage system may have more than two compartments 23, which may correspond to the number of varieties of seeds being used for multiple type or variety planting. Additional compartments 23 may be provided in each of the bulk fill hoppers 21 by divider walls or partitions. It is understood that at least some bulk storage may be at the row units 13 themselves, such as by way of manual-fill on-row storage compartments. The different compartments 23 may hold seeds 17 of a different plant type or a common plant type but different varieties such as Variety-A and Variety-B indicated by 17a, 17b for planting in different multiple type or variety zones of an agricultural field defined at least in part by characteristics relating to at least one of soil type and management type, or other characteristics such as low/high ground areas, weed issues, insect issues, fungal issues, buffer zones in organic fields that are planted next to non-organic fields, or others, such as those represented as zones of Variety-A and Variety-B in the prescription map schematically represented in the path map of FIG. 11. Although two different seed varieties 17a, 17b, are shown it is understood that other numbers of seed varieties such as a third variety as Variety-C (not shown) or others may be stored on and planted by the planter 7 based on, for example, the number of compartments 23 in the bulk storage system 19 for a particular planter 7. Although the seed 17 may be described elsewhere herein as different types or varieties, it is understood that the description of the different types or varieties of seed includes different hybrids or products. In other words, the different types or varieties 17a, 17b of seed 17 include not only different hybrids or varieties of the same plant species, but also different seed products, including seeds of different species and coated and uncoated seeds, such as insecticide coated and non-insecticide coated seeds. The different seed products can also include refuge in a bag seed and non-refuge in a bag seed, plant-parasite resistant seed and non-plant-parasite resistant seed such as cyst nematodes resistant seeds and non-cyst nematodes resistant seeds, herbicide-tolerant seed and non-herbicide tolerant seed, or other different products. The different seed products can further include different crop seeds such as corn and soybeans, oats, and barley, different cover crops such as tillage radishes and rye, or various combinations of these or other combinations.

Figure 2:
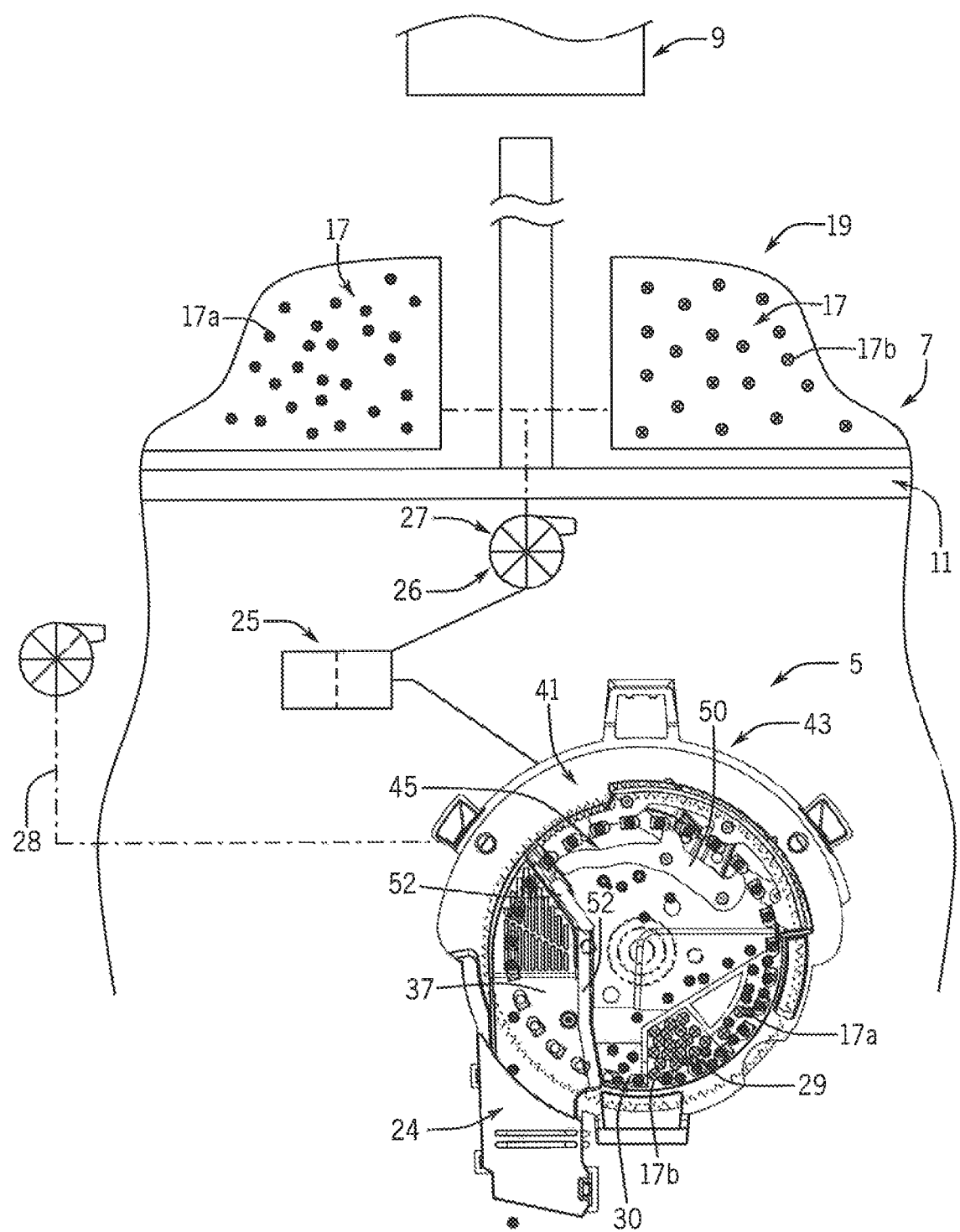
FIG. 2 is a simplified partially schematic representation of portions of the planter of FIG. 1, including a seed meter in accordance with the present invention.

Referring now to FIG. 2, planter 7 can include airflow system 26 that provides pneumatic power for use by various components of the planter 7 by way of, for example, positive air pressure source(s) and vacuum source(s) for establishing positive and/or vacuum pressures and corresponding airflows, depending on the particular configurations of the pneumatic system(s) in which they are incorporated. The positive air pressure source(s) and vacuum source(s) can be known pumps, fans, blowers, and/or other known airflow system components and include fittings, tubing, and other components to interconnect components of airflow system 26 to each other and/or components of other systems of planter 7. Airflow system 26 includes a seed conveyance airflow system 27 and a seed meter airflow system 28. Seed conveyance airflow system 27 pneumatically delivers seeds 17 from the bulk storage system 19 into an on-row storage system 25. Seed conveyance airflow system 27 delivers the seed 17 in an airflow that entrains the seed 17 and flows along a flow path defined by, for example, conduits that extend along the planter 7 to the row units 13 to be dropped through a seed delivery chute 24 into the seed trench formed by the furrow opening mechanism. Each row unit 13 may have more than one compartment, such as multiple compartments of a segmented mini-hopper optionally, at least one on-row bulk tank, or other separate and distinct compartments, to separately simultaneously store the different seed varieties 17a, 17b in the on-row storage system 25 that feeds seed meter 5. Seed meter airflow system 28 provides negative and/or positive pressure for operation of seed meters 5 at the row units 13, explained in greater detail elsewhere herein.

Figure 3:
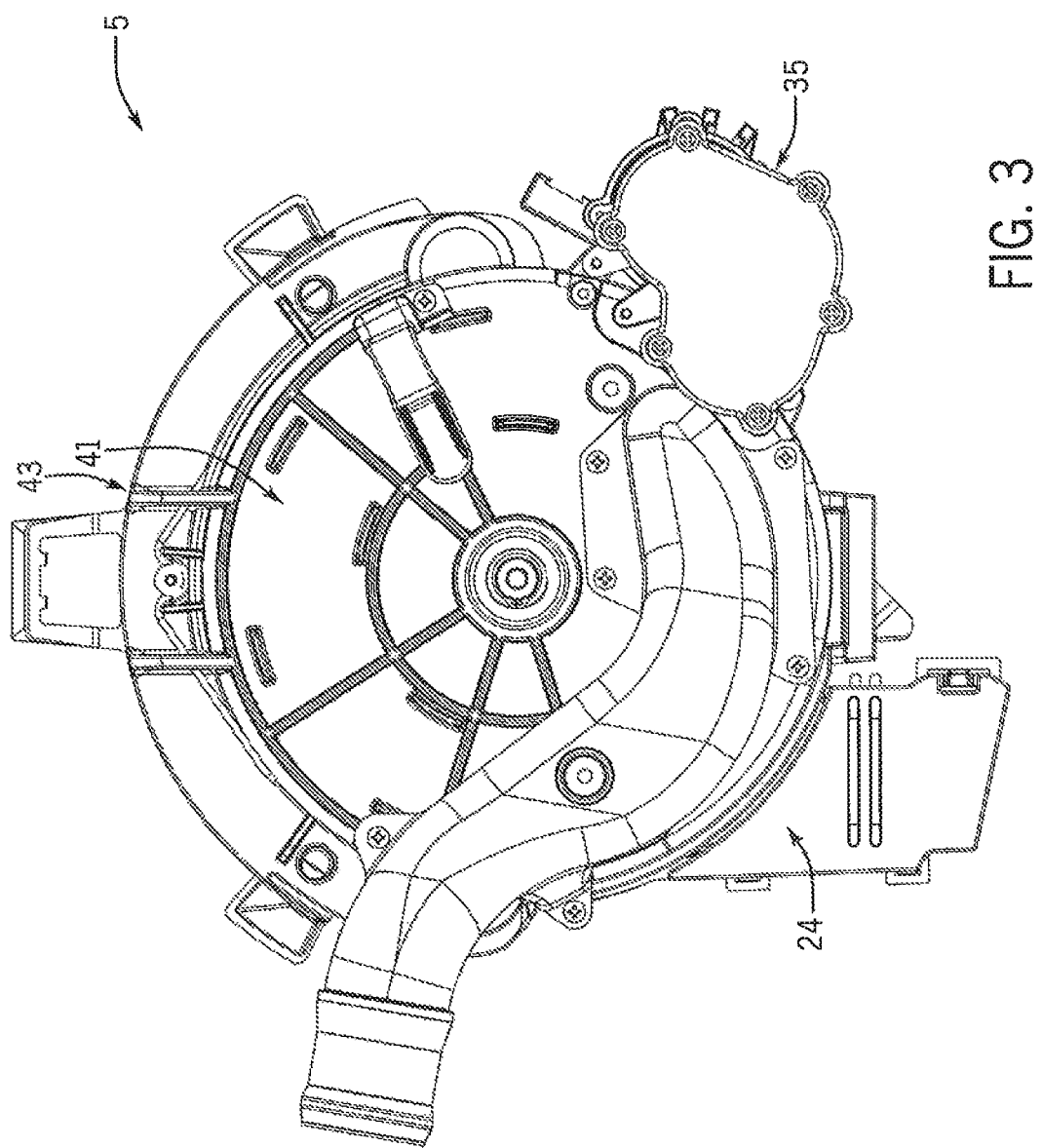
FIG. 3 is a pictorial view of a fully assembled seed meter of FIG. 2.

Still referring to FIG. 2, each seed meter 5 can be a purely mechanical-type seed meter 5 or a pneumatic seed meter 5. Seed meter 5 maintains a seed supply sump 29 and a seed return sump 30 for pooling seeds 17 inside of seed meter 5, explained in greater detail elsewhere herein, for presenting seeds in a particular order to an internal seed transport member 37. Seed transport member 37 is rotated through at least part of the seed return sump 30 followed by the seed supply sump 29 to pick up and singulate seeds in that order using cells, such as seed pockets, fingers or holes in the surface of the seed transport member, at seed pickup regions of the seed return sump 30 and the seed supply sump 29. The individual seeds are moved through the seed meter 5 for individual release through a seed delivery system (not shown), which may include a seed tube, a seed delivery belt, or other seed delivery mechanism, toward a seed trench of the agricultural field. Travel of seed transport member 37 is accomplished by way of a seed transport member drive system 35 (FIG. 3). The seed transport member drive system 35 may include, for example, various electric or hydraulic motors, drive shafts, chains, belts, clutches, peg-and-hole drive systems, and/or other arrangements such as a directly driven arrangement in which a motor directly drives the seed transport member 37 at its hub or periphery. Pneumatic seed meters 5 of negative pressure types are further operably connected through a vacuum inlet (not shown) to the seed meter airflow system 28 of airflow system 26 to provide a vacuum airflow within a vacuum chamber establishing a negative or vacuum pressure within the seed meter 5 opposite the seed supply sump 29 and the seed return sump 30 allowing the seeds 17 to be held against the seed transport member 37 within the cells by the vacuum pressure. Pneumatic seed meters 5 of positive pressure types are operably connected through a pressurized air inlet (not shown) to the seed meter airflow system 28 to provide a positive airflow and a corresponding positive pressure at the seed side of the seed transport member 37 within the seed meter 5, whereby seeds from the seed supply sump 29 and the seed return sump 30 are pushed and held against the seed transport member 37, such as within the cells, by positive pressure. Seed meter airflow system 28 of either negative or positive pressure type seed meters may also provide negative pressure to an evacuating system for extracting or evacuating seed from the seed supply sump 29 or the seed return sump 30 and returning the extracted or evacuated seed to storage outside of seed meter 5.

With additional reference to FIG. 3, seed meter 5 includes a housing 41 with first and second side portions or covers, one of which is removed to provide the view of FIG. 2. The side portions or covers connect to each other at their peripheries defined by respective circumferential side walls with the open ends facing toward each other to collectively define an enclosure 43 that surrounds housing cavity 45 in which seed transport member 37 can be at least partially arranged for rotation. Although seed transport member 37 is shown in FIG. 2 as entirely enclosed within housing 41 and its housing cavity 45, it is understood that at least a portion of seed transport member 37 may extend out of the housing 41 and its housing cavity 45. Other components may be arranged within the housing cavity 45, such as various seals that engage seed transport member 37 to provide vacuum shutoff or positive pressure isolation and a seed singulator 50 that is configured to inhibit more than one seed from being discharged from the seed meter 5 per seed discharge event. A brush assembly 52 may be arranged within the housing cavity 45 to form a barrier that retains the seed 17 inside the housing cavity 45 instead of, for example, spilling out of the meter through the seed delivery system.

Figure 4:
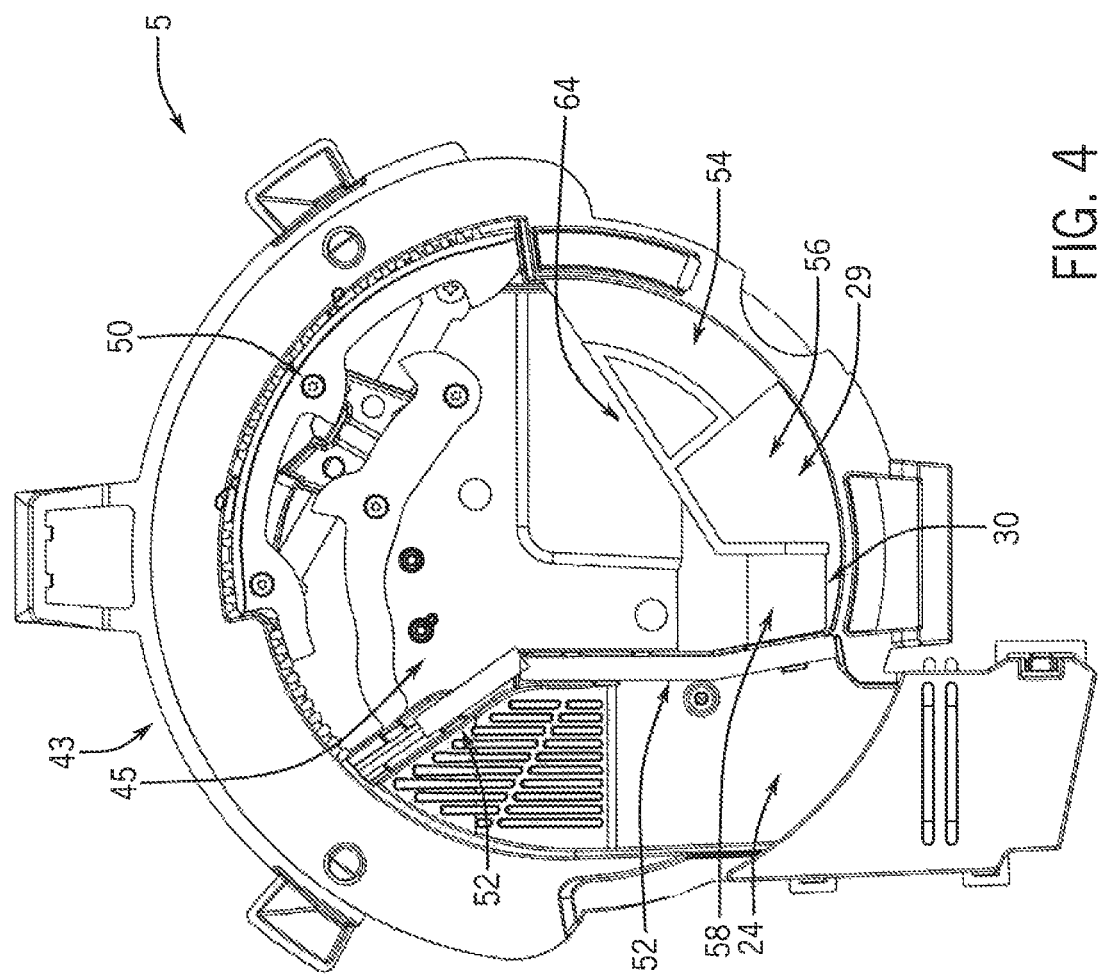
FIG. 4 is a pictorial view of the seed meter of FIG. 2 with vacuum housing and seed transport member removed to show interior detail.

Referring now to FIG. 4, pictorial view of the seed meter 5 with the housing 41 and the seed transport member 37 removed to show interior detail in the housing cavity 45 is provided in accordance with an aspect of the invention. The seed meter 5 includes the seed supply sump 29 within the housing cavity 45. The seed supply sump 29 can be configured to collect seeds 17 received from outside of the housing cavity through a seed supply port 56 in communication with a seed conveyance conduit in line with the airflow system 26 (FIG. 2). In an alternative aspect in which seeds 17 are stored exclusively at the row units 13, the seed supply sump 29 can be configured to collect seeds 17 without a seed conveyance conduit or seed conveyance airflow system.

Accordingly, travel of the seed transport member 37 through the seed supply sump 29 can capture seeds 17 in cells of the seed transport member 37 when such cells are empty. Also, travel of the seed transport member 37 through the seed supply sump 29 can move captured seeds 17 in the cells along with at least some uncaptured seeds 17 from the seed supply sump 29 through a seed supply path 54 in the housing cavity 45. The at least some uncaptured seeds 17 can be moved through the seed supply path 54 due to the narrowness of the supply path 54 with respect to the seed supply sump 29 and the seeds 17 captured in cells tending to drag uncaptured seeds 17 as the seed transport member 37 rotates. In one aspect, no cross sectional dimension of the seed supply path 54 exceeds 20 millimeters with respect to the direction of travel of seed cells of the seed transport member as it passes through the seed supply path 54 (thereby defining its narrowness for seed passage).

The seed meter 5 also includes the seed return sump 30 within the housing cavity 45. The seed return sump 30 can be configured to collect seeds 17 received from within the housing cavity 45 through a seed return path 58. Travel of the seed transport member 37 past the seed supply path 54 causes the aforementioned uncaptured seeds 17 to fall to the seed return path 58 while the captured seeds 17 continue to rotate in the cells of the seed transport member 37 for individual delivery through the seed delivery chute 24 onto the agricultural field. The seed return sump 30 is arranged before the seed supply sump 29 in a direction of travel of the seed transport member 37 (shown counter-clockwise in the drawings) so that empty cells of the seed transport member 37 travel through the seed return sump 30 to pick up available seeds 17 in the seed return sump 30 before traveling through the seed supply sump 29 to pick up available seeds 17 in the seed supply sump 29. Accordingly, when the first variety of seeds 17a is collected in the seed supply sump, seeds 17a will collect in the seed return sump 30. Then, when collection of the first variety of seeds 17a in the seed supply sump 29 stops, and collection of the second variety of seeds 17b in the seed supply sump 29 starts, seeds 17a collected in the seed return sump 30 will be prioritized for delivery over the seeds 17b.

Figure 5:
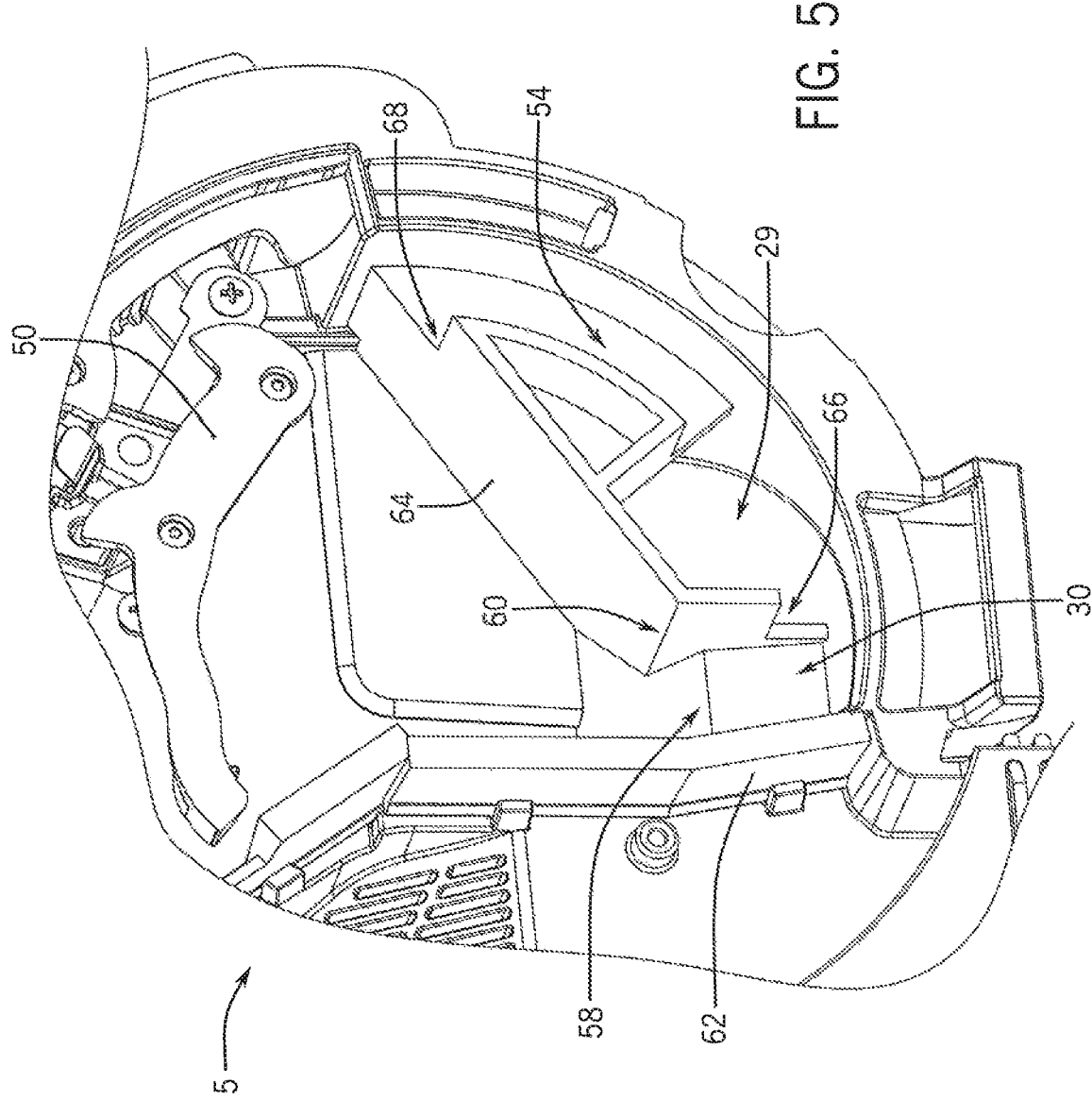
FIG. 5 is an isometric view of a divider arranged interior to the seed meter of FIG. 2 in accordance with an aspect of the invention.

With additional reference to FIG. 5, in one aspect, the seed supply sump and the seed return sump can be partially separated by a divider wall 60. The divider wall 60 can comprise a wall 62 connected to a ramp 64. The ramp 64 could be a slope disposed at a certain angle with respect to the wall 62, such as a 30 degree angle. Accordingly, travel of the seed transport member 37 past the seed supply path 54 can cause the aforementioned uncaptured seeds 17 to fall on the ramp 64, leading downward to the seed return path 58, and then the seed return sump 30, partially separated from the seed supply sump 29 by the wall 62.

In one aspect, the wall 62 can include a wall notch 66 at a lower end that is configured to permit seeds 17 captured in cells of the seed transport member 37 to pass from the seed return sump 30 to the seed supply sump 29 as the seed transport member 37 rotates while substantially preventing uncaptured seeds 17 in the seed return sump 30 from also passing to the seed supply sump 29. The ramp 64 can similarly include a ramp notch 68 at an upper end that is configured to promote rapid delivery of uncaptured seeds 17 to the seed return path 58, along the ramp 64, as captured seeds 17 continue to rotate in the cells of the seed transport member 37 for individual delivery through the seed delivery chute 24.

Referring now to FIGS. 1 and 6-11, a control system can include a tractor control system 72 and a planter control system 74 that operably communicate with each other, for example, by way of an ISOBUS connection, for coordinating controls of tractor 9 (FIG. 1) and planter 7 (FIG. 1), including which seed variety(ies) 17a, 17b are delivered, based on the type or variety zones Variety-A, Variety-B, and so forth, of the agricultural field. Variety zones Variety-A, Variety-B, may correspond to a seed type or variety prescription map (PM) as schematically represented in the path map shown in FIG. 11. The tractor control system 72 can include a tractor controller and power supply, and the planter control system 74 can include a planter controller and power supply. Each of the tractor and planter controllers can include an industrial computer or, e.g., a programmable logic controller (PLC), along with corresponding software and suitable memory for storing such software and hardware, including interconnecting conductors for power and signal transmission for controlling respective electronic, electro-mechanical, hydraulic, and pneumatic components of the tractor 9 and planter 7. The tractor controller can be configured for controlling the functions of the tractor 9 by controlling, e.g., steering, speed, braking, shifting, and other operations of the tractor, which may include controlling various GPS steering or other GPS-related systems, transmission, engine, hydraulic, and/or other systems of the tractor 9. A tractor interface system is operably connected to the tractor controller and includes a monitor and various input devices to allow an operator to see the statuses and to control various operations of the tractor 9 from within the cab of the tractor 9. The tractor interface system may be a MultiControl Armrest™ console available for use with the Maxxum™ series tractors from Case IH. The planter controller can be configured for controlling the functions of planter 7 by controlling, e.g., product conveyance along the planter 7, seed 17 variety delivery selection, and seed delivery out of planter 7 to the field. This may include controlling the positive pressure and vacuum pumps and/or other vacuum sources, as well as fans, blowers, actuators, and other components of seed conveyance and seed meter airflow systems 27, 28. During use, the control system can determine planter position, speed, heading, and/or other movement characteristics by way of monitoring tractor position and movement through the tractor controller. The tractor controller may evaluate, for example, a speed input signal from a tractor speed sensor along with a GPS signal or data from tractor GPS with respect to the prescription map. Using such evaluations, the control system can determine which row units 13 should plant which seed variety(ies) 17a, 17b and when, to achieve such multi-seed variety planting. The planter controller can command delivery of the appropriate seed variety 17a, 17b to seed meter 5.

Figure 11:
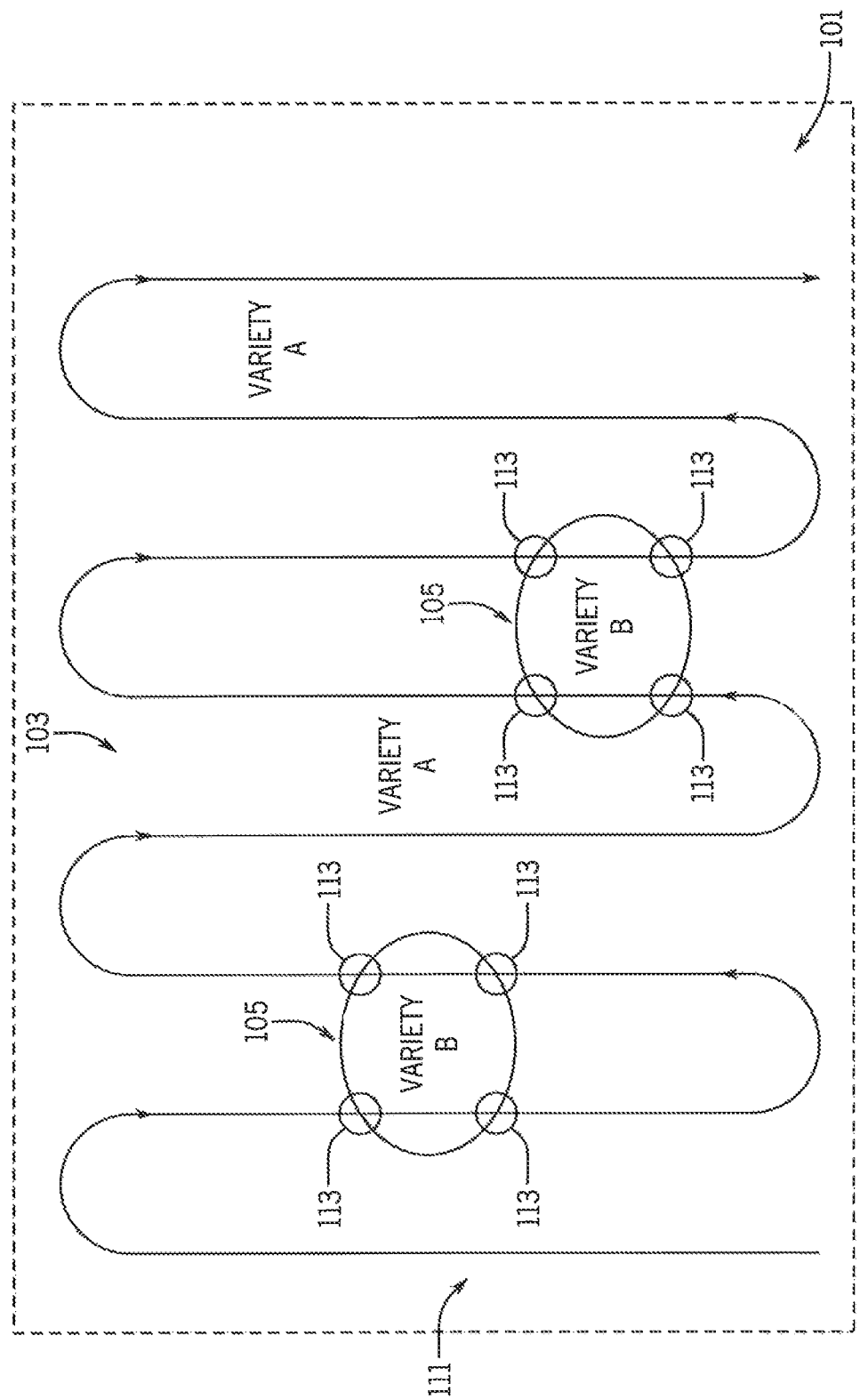
FIG. 11 is a simplified representation of a prescription map shown on a path map of multi-variety planting of a field.

In FIG. 11, a path map is shown with a simplified schematic representation of a prescription map of field 101 showing at least two zones, including Variety-A and Variety-B respectively shown as zones 103 and 105 for receiving two different varieties of seed 17a, 17b. Tractor 9 (FIG. 1) and planter 7 (FIG. 1) travel along path 111 through field 101 while traveling through the Variety-A and Variety-B zones 103, 105. Seed variety switching events 113 are shown as labeled circles. Switching events implicate switching from Variety-A (and seed 17a) to Variety-B (and 17b) or switching from Variety-B (and seed 17b) to Variety-A (and 17a). Switching events 113 can result in a brief mix of seed varieties 17a, 17b.

Figure 6:
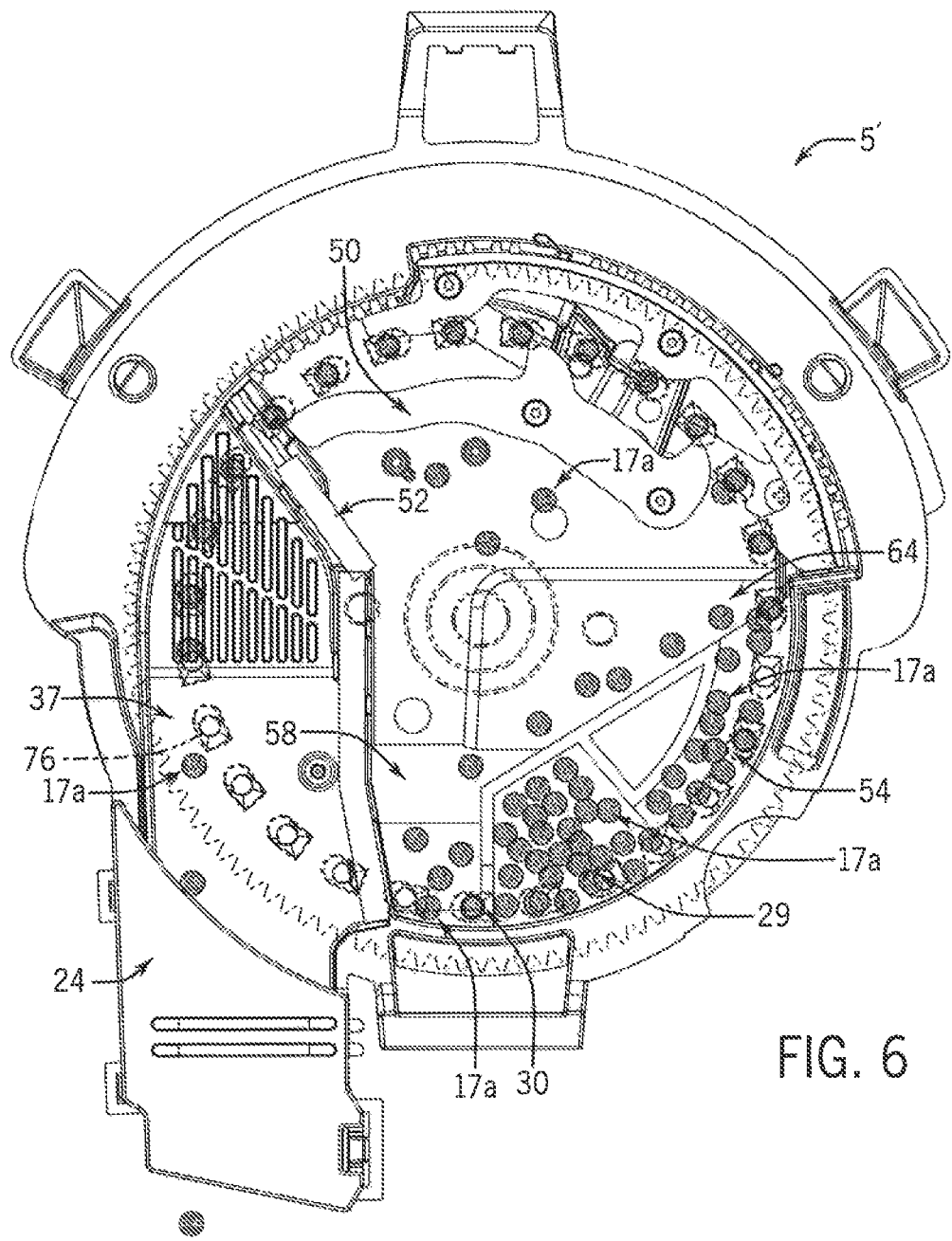
FIG. 6 is a pictorial view of the seed meter of FIG. 2 in a first state in which a first variety of seed is metered during steady state operation.

Referring specifically to FIGS. 6 and 11, to begin execution of the prescription map of field 101, the control system can control the tractor 9 and the planter 7 to travel along path 111 while delivering the first seed variety 17a in the Variety-A zone 103. This may correspond to a first state of the seed meter 5' in which the first variety of seed 17a is metered during a steady state operation. Accordingly, the first seed variety 17a can be supplied through the seed supply port 56 and collect in the seed supply sump 29. The seed transport member 37 can capture seeds 17a in the seed supply sump 29 in empty cells as the seed transport member 37 rotates through the seed supply sump 29 in a counter-clockwise direction. Travel of the seed transport member 37 through the seed supply sump 29 moves captured seeds 17a in cells 76, and at least some uncaptured seeds 17a not captured in cells 76, through the seed supply path 54. Travel of the seed transport member 37 through the seed supply path 54 causes most of the at least some uncaptured seeds 17a to fall on the ramp 64 to the seed return path 58 while the captured seeds 17a continue to rotate in the cells 76. The singulator 50 can remove some portion of captured seeds 17 in circumstances where more than one seed is captured by a cell 76. As the seed transport member 37 continues to move past the brush assembly 52, with only seeds 17a captured in cells 76, the seeds 17a are released from their cells 76 for individual delivery onto the agricultural field in the Variety-A zones 103. Then, as the seed transport member 37 continues to rotate, empty cells 76 are presented first to the seed return sump 30, which is arranged before the seed supply sump in a direction of travel of the seed transport member 37, before being presented the seed supply sump 29. The empty cells 76 presented in the seed return sump 30 pick-up available seeds 17a, which move to the seed supply sump 29 as captured seeds 17a in cells 76, as this steady state operation continues through the Variety-A zone 103.

Figure 7:
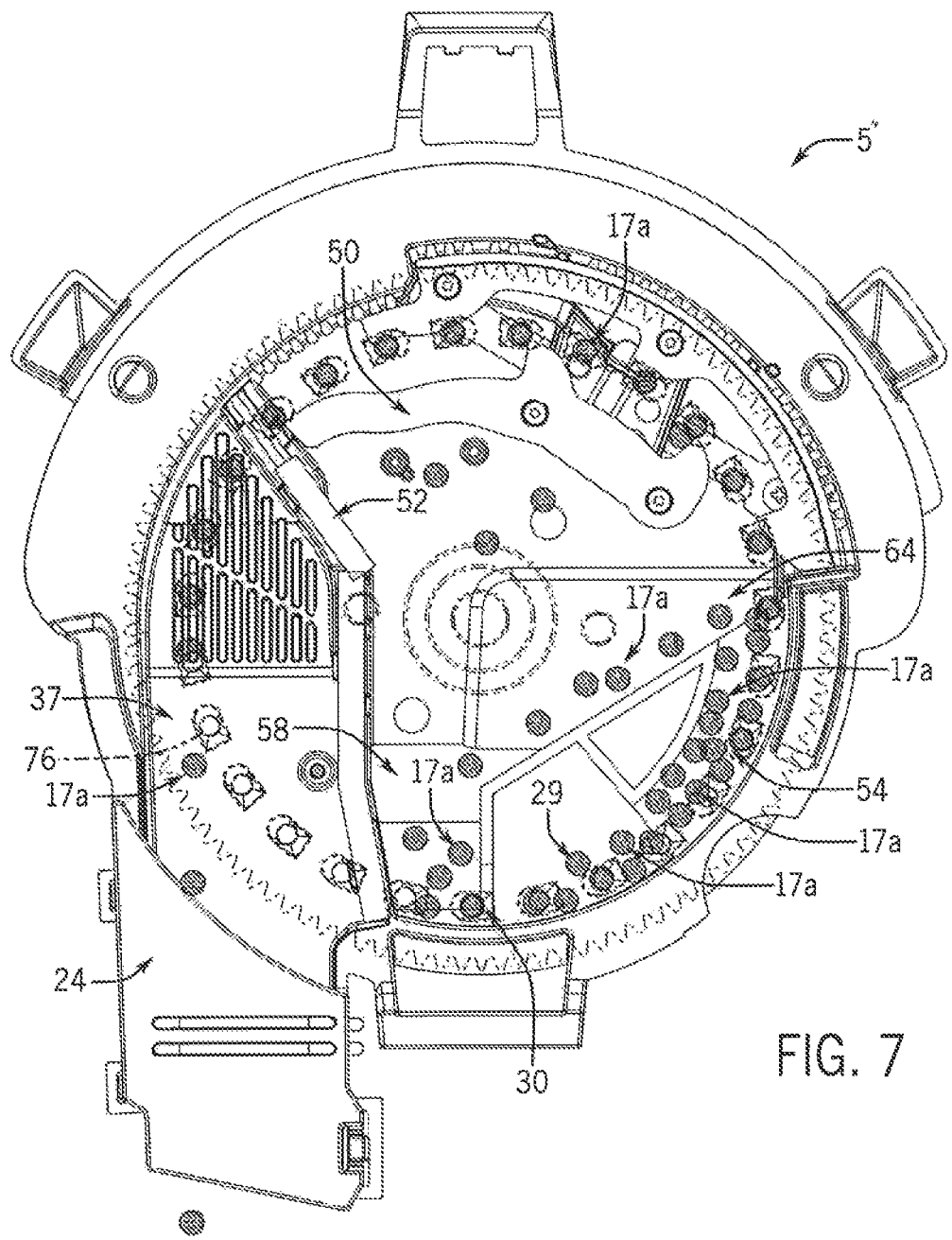
FIG. 7 is a pictorial view of the seed meter of FIG. 2 in a second state in which supply of the first variety of seed is discontinued.

Referring now to FIGS. 7 and 11, as execution of the prescription map approaches the Variety-B zone 105, the control system can control the tractor 9 and the planter 7 at the switching event 113 to discontinue delivery of the first seed variety 17a in anticipation of delivery of the second seed variety 17b. This may correspond to a second state of the seed meter 5" in which supply of the first variety of seed 17a is discontinued. Accordingly, supply of the first seed variety 17a through the seed supply port 56 can stop as the collection of seeds 17a in the seed supply sump 29 diminishes with continued travel of the seed transport member 37. As a result, at the switching event 113, while still in the Variety-A zone 103, predominantly the first seed variety 17a is still being delivered onto the field 101.

Figure 8:
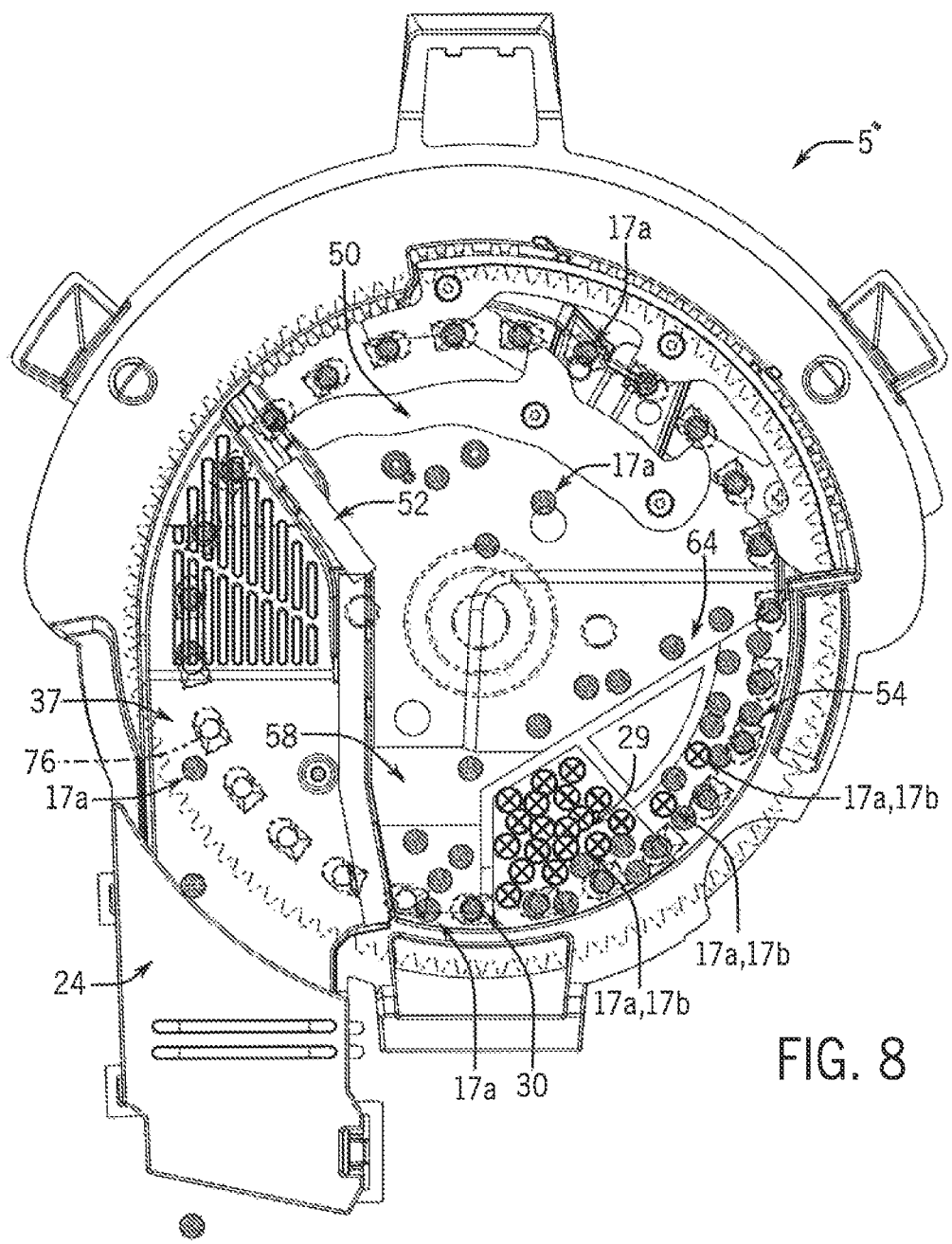
FIG. 8 is a pictorial view of the seed meter of FIG. 2 in a third state in which supply of a second variety of seed is initiated.

Referring now to FIGS. 8 and 11, still at the switching event 113, the control system can control the tractor 9 and the planter 7 to initiate supply of the second seed variety 17b. This may correspond to a third state of the seed meter 5'" in which supply of a second variety of seed 17b is initiated. Accordingly, the second seed variety 17b can be supplied through the seed supply port 56 and collect in the seed supply sump 29. However, with continued travel of the seed transport member 37, the first variety of seed 17a in the seed return sump 30 continue to till empty cells 76, thereby promoting depletion of any remaining seed 17a of the first variety in the seed meter 5'" over delivery of seed 17b of the second variety. In other words, the first variety of seeds 17a in the seed return sump 30 receive priority for delivery onto the field 101 since they are the first seeds encountered by returning empty cells 76 of the seed transport member 37. As a result, at the switching event 113, while still in the Variety-A zone 103, strictly the first seed variety 17a is still being delivered onto the field 101.

Figure 9:
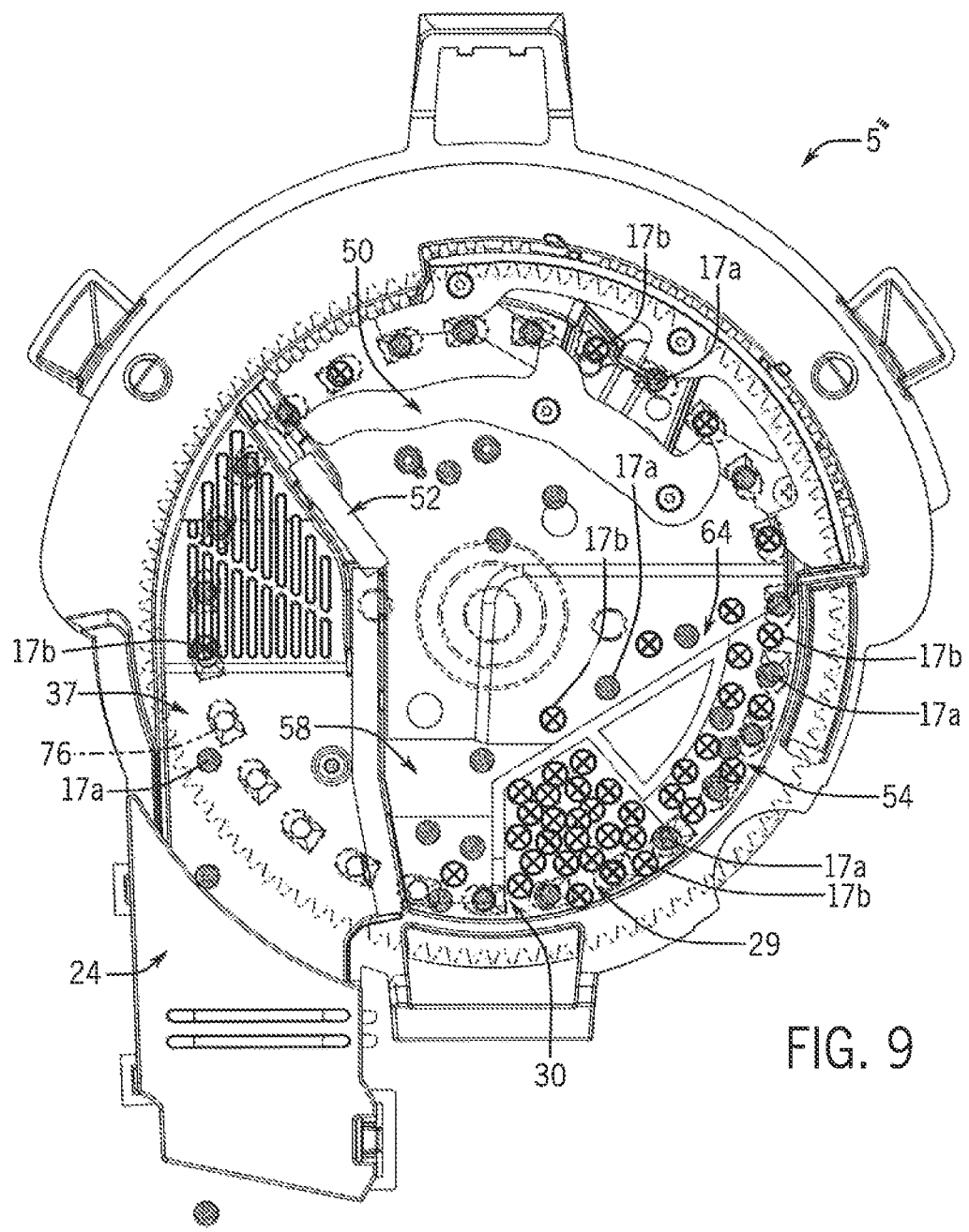
FIG. 9 is a pictorial view of the seed meter of FIG. 2 in a fourth state in which the first and second varieties of seed are metered during mixed state operation.

Referring now to FIGS. 9 and 11, still at the switching event 113, the control system can control the tractor 9 and the planter 7 to meter the first and second varieties of seed 17a, 17b. This may correspond to a fourth state of the seed meter 5"", or mixed state operation, wherein the first and second varieties of seed 17a, 17b are both delivered onto the field 101. Accordingly, once the second seed variety 17b is introduced, the first and second varieties of seed 17a, 17b will be metered in a mixed state, though the first seed variety 17a will tend to be captured first by cells 76 due to being closer to the seed transport member 37. As a result, at the switching event 113, as the tractor 9 and the planter 7 cross into the Variety-B zone 105, a mix of the first and second varieties of seed 17a, 17b is being delivered onto the field 101.

Figure 10:
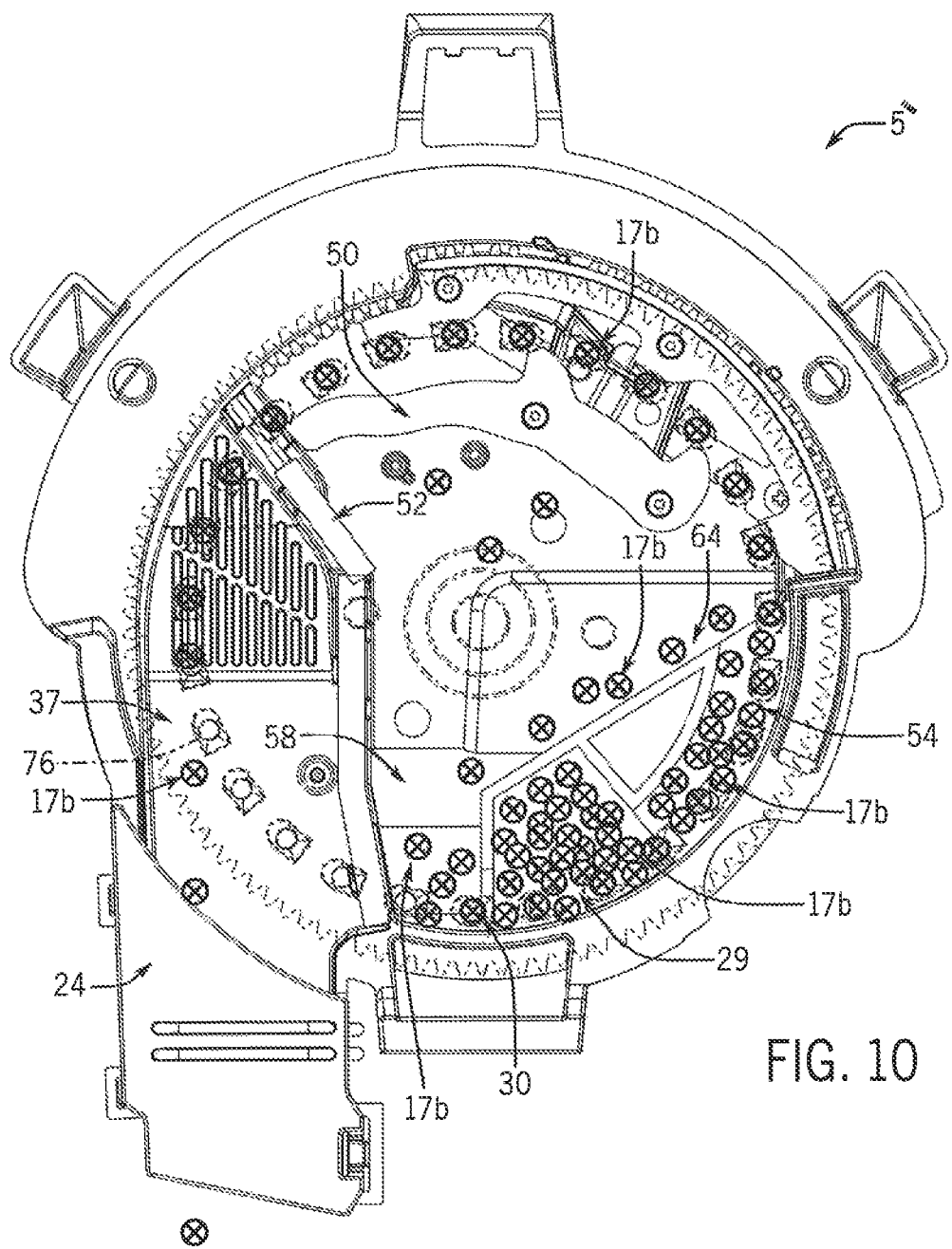
FIG. 10 is a pictorial view of the seed meter of FIG. 2 in a fifth state in which the second variety of seed is metered during steady state operation.

Finally, referring now to FIGS. 10 and 11, as execution of the prescription map enters the Variety-B zone 105, the control system can control the tractor 9 and the planter 7 to travel along path 111 while delivering the second seed variety 17b in the Variety-B zone 105. This may correspond to a fifth state of the seed meter 5""' in which the second variety of seed 17b is metered during a steady state operation. Accordingly, the seed meter 5""' can operate with a steady state delivery of the second seed variety 17b, similar to operation of the seed meter 5' with a steady state delivery of the first seed variety 17a in the first state. As execution of the prescription map approaches the Variety-A zone 105 again, the control system can control the tractor 9 and the planter 7 at the next switching event 113 to discontinue delivery of the second seed variety 17b in anticipation of delivery of the first seed variety 17a. Accordingly, the aforementioned process can repeat for switching between the first and second seed varieties 17a, 17b upon encountering different zones. Moreover, the aforementioned process can repeat for switching to other seed varieties as may be required by the prescription map, such as a third seed variety 17c for a Variety-C zone (not shown).

Figure 12:
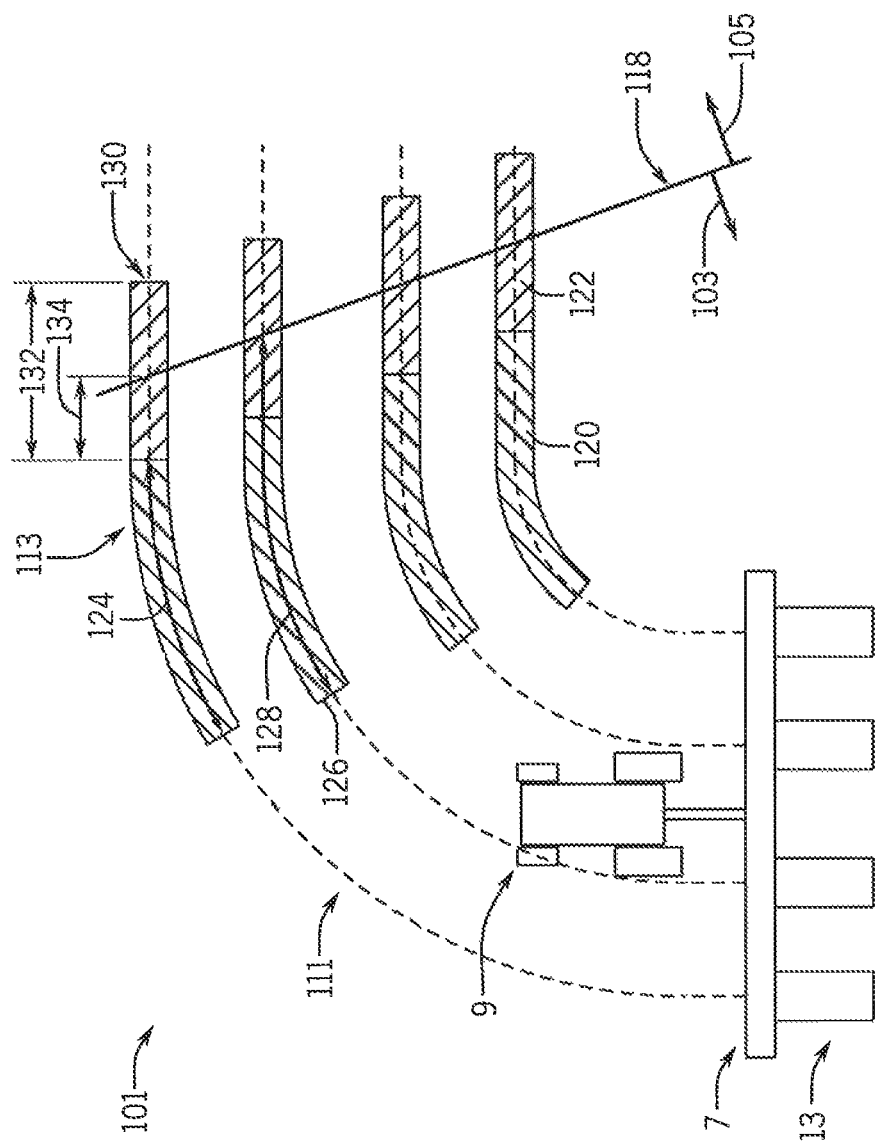
FIG. 12 is a detailed example of a transition from a first variety of seed to a second variety of seed while following a prescription map in accordance with the present invention.

Referring now to FIG. 12, a detailed example of a transition from the first variety of seed 17a in the Variety-A zone 103 to the second variety of seed 17b an the Variety-B zone 105, across a variety zone boundary 118, which could be curved or in a straight line through a switching event 113, is provided in accordance with an aspect of the present invention. In each row, the switching event 113 can include a starvation phase 120 followed by a transition phase 122. The starvation phase 120 can be defined by a starvation distance 124 from when the first variety of seed 17a is shut off (FIG. 7), at a variety change boundary 126 (the moment the system begins starving the meter 5 of any seed 17), to when the second variety of seed 17b is supplied (FIG. 8), beginning at the transition phase 122. Accordingly, the system can travel from the variety change boundary 126 to the variety zone boundary 118 through a variety change distance 128, representing a distance from starving the meter 5 to the actual variety zone boundary 118.

At the beginning of the transition phase 122 when the second variety of seed 17b is supplied (FIG. 8), to an effective change boundary 130 indicating a point at which the planted seeds 17 have effectively switched to the second variety of seed 17b (FIG. 10), a transition distance 132 occurs in which mixed varieties of seed 17 are planted (both the first and second varieties of seed 17a, 17b) (FIG. 9). In the transition distance 132, a transition split percentage 134 can be defined by a user via the control system of FIG. 1. The transition split percentage 134 can have a value indicating a position of the transition zone with respect to the variety zone boundary 118. The transition split percentage 134 could have a value indicating, for example, 0%, 50%, or 100%.

The aforementioned process can repeat for switching between the first and second seed varieties 17a, 17b upon encountering different zones.

Many changes and modifications could be made to the invention without departing from the spirit thereof. Various components and features of the system 5, for example, components, or features of the seed storage system(s), charging system(s), and seed metering system(s) can be incorporated alone or in different combinations on a planter. The scope of these changes will become apparent from the appended claims.

We claim:

1. A seed meter for planting seeds on an agricultural field, comprising:
a housing defining an enclosure that surrounds a housing cavity;
a seed transport member arranged at least partially within the housing cavity, the seed transport member being configured to rotate within the housing cavity, the seed transport member including a plurality of cells configured to individually capture seeds to provide singulation of seeds for individual delivery onto an agricultural field;
a seed supply sump within the housing cavity, the seed supply sump being configured to collect seeds received from outside of the housing cavity through a seed supply port, wherein travel of the seed transport member through the seed supply sump captures seeds in cells when the cells are empty and moves captured seeds and a portion of seeds uncaptured in cells through a seed supply path in the housing cavity;
a seed return sump within the housing cavity, the seed return sump being configured to collect seeds received from within the housing cavity through a seed return path, wherein travel of the seed transport member past the seed supply path causes the portion of seeds uncaptured to fall to the seed return path while the captured seeds continue to rotate in the cells for individual delivery onto the agricultural field; and
a divider wall dividing the seed return sump and the seed supply sump, the divider wall configured to permit seeds captured in the cells to pass from the seed return sump to the seed supply sump and to prevent seeds received in the seed return sump from passing from the seed return sump to the seed supply sump;
wherein the seed return sump is arranged before the seed supply sump in a direction of travel of the seed transport member so that empty cells of the seed transport member travel through the seed return sump to pick up available seeds in the seed return sump before traveling through the seed supply sump to pick up available seeds in the seed supply sump.

2. The seed meter of claim 1, further comprising first and second variety of seeds collected in the seed supply sump, wherein the first variety of seeds collect in the seed return sump before the second variety of seeds collect in the seed return sump.

3. The seed meter of claim 1, wherein the seed return path comprises a ramp, and wherein travel of the seed transport member past the seed supply path causes the portion of seeds uncaptured to fall on the ramp.

4. The seed meter of claim 3, wherein the divider wall is connected to a terminal end of the ramp.

5. The seed meter of claim 1, wherein no cross sectional dimension of the seed supply path exceeds 20 millimeters with respect to a direction of travel of the seed transport member as the seed transport member passes through the seed supply path.

6. A method for planting seeds on an agricultural field, comprising:
rotating a seed transport member arranged at least partially within a housing cavity, the seed transport member including a plurality of cells configured to individually capture seeds to provide singulation of seeds for individual delivery onto an agricultural field;
receiving seeds from outside of the housing cavity through a seed supply port and collecting the seeds in a seed supply sump within the housing cavity, wherein rotating the seed transport member through the seed supply sump captures seeds in cells when the cells are empty and moves captured seeds and a portion of seeds uncaptured in cells through a seed supply path in the housing cavity;
receiving seeds from within the housing cavity through a seed return path and collecting the seeds in a seed return sump within the housing cavity, wherein rotating the seed transport member past the seed supply path causes the portion of seeds uncaptured to fall to the seed return path while the captured seeds continue to rotate with the seed transport member for individual delivery onto the agricultural field;
arranging the seed return sump before the seed supply sump in a direction of travel of the seed transport member so that empty cells of the seed transport member travel through the seed return sump to pick up available seeds in the seed return sump before travelling through the seed supply sump to pick up available seeds in the seed supply sump; and
dividing the seed return sump and the seed supply sump such that seeds captured in the cells are permitted to pass from the seed return sump to the seed supply sump and such that seeds received in the seed return sump are prevented from passing from the seed return sump to the seed supply sump.

7. The method of claim 6, further comprising collecting a first variety of seeds in the seed supply sump through the seed supply port, then collecting a second variety of seeds in the seed supply sump through the seed supply port, wherein the first variety of seeds collect in the seed return sump before the second variety of seeds collect in the seed return sump.

8. The method of claim 7, further comprising individual delivery of a mix of the first and second varieties of seeds onto the agricultural field after a transition from collecting the first variety of seeds in the seed supply sump to collecting the second variety of seeds in the seed supply sump.

9. The method of claim 6, wherein the seed return path comprises a ramp, and further comprising rotating the seed transport member past the seed supply path to cause the portion of seeds uncaptured to fall on the ramp.

10. The method of claim 9, wherein the divider wall is connected to a terminal end of the ramp.

11. The method of claim 6, wherein no cross sectional dimension of the seed supply path exceeds 20 millimeters with respect to a direction of travel of the seed transport member as the seed passes through the seed supply path.

12. A system for planting multiple varieties of seed in a single planting pass during row-crop planting of an agricultural field, comprising:
a housing arranged at a row unit of a planter and defining an enclosure that surrounds a housing cavity;
a seed transport member arranged at least partially within the housing cavity, the seed transport member being configured to rotate within the housing cavity, the seed transport member including a plurality of cells configured to individually capture seeds to provide singulation of seeds for individual delivery onto an agricultural field;

a seed supply sump within the housing cavity, the seed supply sump being configured to collect seeds received from outside of the housing cavity through a seed supply port, wherein travel of the seed transport member through the seed supply sump captures seeds in cells when the cells are empty and moves captured seeds and a portion of seeds uncaptured in cells through a seed supply path in the housing cavity;

a seed return sump within the housing cavity, the seed return sump being configured to collect seeds received from within the housing cavity through a seed return path, wherein travel of the seed transport member past the seed supply path causes the portion seeds uncaptured to fall to the seed return path while the captured seeds continue to rotate in the cells for individual delivery onto the agricultural field; and a divider wall dividing the seed return sump and the seed supply sump, the divider wall configured to permit seeds captured in the cells to pass from the seed return sump to the seed supply sump and to prevent seeds received in the seed return sump from passing from the seed return sump to the seed supply sump;

wherein the seed return sump is arranged before the seed supply sump in a direction of travel of the seed transport member so that empty cells of the seed transport member travel through the seed return sump to pick up available seeds in the seed return sump before traveling through the seed supply sump to pick up available seeds in the seed supply sump.

13. The system of claim 12, further comprising first and second variety of seeds collected in the seed supply sump, wherein the first variety of seeds collect in the seed return sump before the second variety of seeds collect in the seed return sump.

14. The system of claim 12, wherein the seed return path comprises a ramp, and wherein travel of the seed transport member past the seed supply path causes the portion seeds uncaptured to fall on the ramp.

15. The system of claim 14, wherein the divider wall is connected to a terminal end of the ramp.

16. The system of claim 12, wherein no cross sectional dimension of the seed supply path exceeds 20 millimeters with respect to a direction of travel of the seed transport member as the seed passes through the seed supply path.

* * * * *